United States Patent
Boulos et al.

(10) Patent No.: US 7,442,438 B2
(45) Date of Patent: Oct. 28, 2008

(54) WET AND DRY STICK ADHESIVE, ARTICLES, AND METHODS

(75) Inventors: Marie A. Boulos, West St. Paul, MN (US); Dominic L. Fedie, Ellsworth, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 531 days.

(21) Appl. No.: 11/121,798

(22) Filed: May 4, 2005

(65) Prior Publication Data

US 2006/0251893 A1  Nov. 9, 2006

(51) Int. Cl.
*B32B 7/12* (2006.01)
(52) U.S. Cl. ............................ 428/355 AC; 428/355 R; 428/355 EN; 526/931
(58) Field of Classification Search ............... 526/931; 428/343, 355 R, 355 EN, 355 AC
See application file for complete search history.

(56) References Cited

U.S. PATENT DOCUMENTS

| | | | |
|---|---|---|---|
| 4,737,559 A | 4/1988 | Kellen et al. | |
| 5,753,768 A | 5/1998 | Ellis | |
| 6,441,092 B1 * | 8/2002 | Gieselman | 525/191 |
| 6,497,949 B1 | 12/2002 | Hyde et al. | |
| 6,518,343 B1 | 2/2003 | Lucast et al. | |
| 6,855,386 B1 | 2/2005 | Daniels et al. | |

FOREIGN PATENT DOCUMENTS

| | | |
|---|---|---|
| WO | WO 94/03550 | 2/1994 |
| WO | WO 00/78884 A1 | 12/2000 |
| WO | WO 00/78885 A1 | 12/2000 |

\* cited by examiner

*Primary Examiner*—Thao T. Tran
(74) *Attorney, Agent, or Firm*—David B. Patchett

(57) ABSTRACT

An adhesive article is disclosed. The adhesive article includes a reinforced tape and a pressure sensitive layer disposed on the reinforced tape. The pressure sensitive layer includes an adhesive blend of 25 to 75 parts by weight of a first hydrophilic pressure sensitive adhesive having a first polyacrylate, 60 to 24 parts by weight of a non-hydrophobic pressure sensitive adhesive having a second polyacrylate, and 15 to 1 parts by weight of a tackifying agent. The adhesive blend includes a cross linking agent. The non-hydrophobic pressure sensitive adhesive is miscible in the hydrophilic pressure sensitive adhesive and the second polyacrylate is different from the first polyacrylate. Methods of making and using adhesive articles are also disclosed.

10 Claims, No Drawings

WET AND DRY STICK ADHESIVE, ARTICLES, AND METHODS

BACKGROUND

The present disclosure relates generally to wet and dry stick adhesives, articles including the same and methods of making and using the same.

Pressure-sensitive adhesive (PSA) tapes have been used for more than half a century for a variety of marking, holding, protecting, sealing and masking purposes. Pressure-sensitive adhesive tapes generally include a backing or substrate, and a pressure-sensitive adhesive. Many pressure-sensitive adhesives require no activation other than finger pressure, exert a strong holding force and can be removable from a smooth surface without leaving a residue.

Pressure-sensitive adhesives require a delicate balance of viscous and elastic properties that result in a four-fold balance of adhesion, cohesion, stretchiness and elasticity. Pressure-sensitive adhesives generally include a polymer that is either inherently tacky or can be tackified with the addition of tackifying resins. In many instances pressure sensitive adhesives can be coated in solvent or as water-based emulsions to reduce the material viscosity to a level that is easily applied to a substrate of choice.

Pressure sensitive adhesives that adhere both to wet and dry surfaces are difficult to produce due to, in part, the competing properties needed to adhere to both wet and dry surfaces. Previous attempts have included blending a hydrophilic pressure sensitive adhesive with a hydrophobic pressure sensitive adhesive. These adhesives provide dry adhesion to many surfaces but lack sufficient wet adhesion to many surfaces. In addition, the incompatibility of the hydrophobic and hydrophilic materials also increases the possibility of phase separation or component migration over time, leading to deterioration in adhesive performance.

SUMMARY

The present disclosure relates generally to wet and dry stick adhesives, articles including the same and methods of making and using the same. More specifically, this disclosure is directed to a pressure sensitive adhesive blend that maintains pressure sensitive adhesive performance properties to a range of substrates having both wet and dry surfaces.

In one embodiment an adhesive article is disclosed. The adhesive article includes a reinforced tape and a pressure sensitive layer disposed on the reinforced tape. The pressure sensitive layer includes an adhesive blend of 25 to 75 parts by weight of a first hydrophilic pressure sensitive adhesive having a first polyacrylate, 60 to 24 parts by weight of a non-hydrophobic pressure sensitive adhesive having a second polyacrylate, and 15 to 1 parts of a tackifying agent. The adhesive blend further includes and a cross linking agent. The non-hydrophobic pressure sensitive adhesive is miscible in the hydrophilic pressure sensitive adhesive and the second polyacrylate is different from the first polyacrylate.

In another embodiment an adhesive blend includes a first hydrophilic pressure sensitive adhesive, a second pressure adhesive, and a tackifying agent. The first hydrophilic pressure sensitive adhesive is a polymerization product of (a) 15 to 85 parts by weight of a first (meth)acrylate ester monomer, where the (meth)acrylate ester monomer, when polymerized, has a glass transition temperature (Tg) of less than about 10 degrees Celsius. (b) 85 to 15 parts by weight of a first hydrophilic acidic comonomer; and (c) at least 10 parts based on 100 parts of the sum of components (a)+(b) of a plasticizing agent. The second pressure sensitive adhesive is a polymerization product of (a) 75 to 99 parts by weight of a second (meth)acrylate ester monomer; and (b) 25 to 1 parts by weight of a second hydrophilic acidic comonomer. The second pressure sensitive adhesive is miscible in the first hydrophilic pressure sensitive adhesive.

Yet other embodiments include methods of manufacturing an adhesive article. One method includes the steps of forming a hydrophilic pressure sensitive adhesive having a first polyacrylate and forming a non-hydrophobic pressure sensitive adhesive having a second polyacrylate. The non-hydrophobic pressure sensitive adhesive is miscible in the hydrophilic pressure sensitive adhesive, and the second polyacrylate is different from the first polyacrylate. Then, the hydrophilic pressure sensitive adhesive is compounded with the non-hydrophobic pressure sensitive adhesive, and a tackifying agent to form an adhesive blend. The adhesive blend further includes a cross-linking agent. This adhesive blend is then disposed as a layer on a reinforced tape to form an adhesive blend tape.

A further embodiment includes method of using an adhesive article. The method includes the steps of providing an adhesive article including a reinforced tape and a pressure sensitive layer disposed on the reinforced tape. The pressure sensitive layer includes an adhesive blend of 25 to 75 parts by weight of a first hydrophilic pressure sensitive adhesive having a first polyacrylate, 60 to 24 parts by weight of a non-hydrophobic pressure sensitive adhesive having a second polyacrylate, and 15 to 1 parts by weight of a tackifying agent. The adhesive blend includes a cross-linking agent. The non-hydrophobic pressure sensitive adhesive is miscible in the hydrophilic pressure sensitive adhesive, and the second polyacrylate is different from the first polyacrylate. Then the pressure sensitive adhesive blend layer is adhered on a wet or a dry surface. The pressure sensitive adhesive blend layer can adhere to both the wet surface and the dry surface.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, % wt, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to a composition containing "an adhesive" encompasses embodiments having one, two or more adhesives. As used in this specification and the appended claims, the term "or" is generally employed in its sense including "and/or" unless the content clearly dictates otherwise.

The term "pressure-sensitive adhesive" or "PSA" refers to a viscoelastic material that possesses the following properties: (1) aggressive and permanent tack, (2) adherence with no more than finger pressure, (3) sufficient ability to hold onto a substrate, and (4) sufficient cohesive strength to be removed cleanly from the substrate.

The term "hydrophilic adhesive" refers to a material that exhibits pressure-sensitive adhesive properties when adhered to a wet substrate. Hydrophilic adhesives may or may not demonstrate pressure-sensitive adhesive properties under dry conditions.

The term "(meth)acrylate monomers" are acrylic acid esters or methacrylic acid esters of non-tertiary alcohols, the alcohols can have about 4 to 12 carbon atoms.

The term "hydrophilic acidic comonomers" are water soluble ethylenically unsaturated, free radically reactive monomers having carboxylic, sulfonic or phosphonic acid functionality and are copolymerizable with the (meth)acrylate monomers.

The present disclosure relates generally to wet and dry stick adhesive blends, articles including the same and methods of making and using the same. More specifically, this disclosure is directed to a pressure sensitive adhesive blend that maintains pressure sensitive adhesive performance properties to a range of substrates having both wet and dry surfaces.

The pressure sensitive adhesive blend includes a mixture of an acrylic-based hydrophilic pressure sensitive adhesive and a second acrylic-based pressure sensitive adhesive that is miscible with the hydrophilic pressure sensitive adhesive. In many embodiments, the pressure sensitive adhesive blend includes a mixture of a hydrophilic "wet stick" acrylic adhesive that exhibits wet adhesion properties and a miscible "dry stick" acrylic adhesive that exhibits dry adhesion properties. In some embodiments, the pressure sensitive adhesive blend includes a mixture of an acrylic-based hydrophilic pressure sensitive adhesive and an acrylic-based non-hydrophobic pressure sensitive adhesive that is miscible with the hydrophilic pressure sensitive adhesive. In many embodiments, neither adhesive individually exhibits sufficient wet and dry adhesion performance properties, but in combination, exhibits both sufficient wet and dry adhesion properties. In some embodiments, the combination of adhesives provide greater wet stick adhesion than the individual wet stick adhesive and greater dry stick adhesion than the individual dry stick adhesive.

The acrylic-based hydrophilic pressure sensitive adhesive and the second acrylic-based pressure sensitive adhesive are miscible or compatible such that component phase separation or migration over time in substantially reduced. In many embodiments, a tackifying agent can be included in the pressure sensitive blend. In some embodiments, a curing agent can be included in the pressure sensitive adhesive blend and subsequently cured to further reduce component phase separation or migration over time. The curing agent or cross-linking agent can be included in the adhesive blend, as such, the curing or cross-linking agent can be a component of the acrylic-based hydrophilic pressure sensitive adhesive, the second acrylic-based pressure sensitive adhesive, and/or compounded into the blend separately, as desired.

The disclosed pressure sensitive adhesive blend can be utilized in conjunction with a substrate or backing to form a tape capable of adhering to wet and dry surfaces. In some embodiments, the tape or substrate can be a reinforced tape or substrate such as, for example, a duct tape having a polyester fiber scrim. In some embodiments, the adhesive tape is formed without a low adhesion backside (LAB) or release liner system. In some embodiments, the adhesive tape is formed with a low adhesion backside (LAB) or release liner system.

Adhesives blends described herein uniquely balance dry- and wet-surface adhesion characteristics and include a hydrophilic PSA (wet-stick adhesive) and a second compatible or miscible PSA (dry-stick adhesive). In many embodiments, adhesive blends include additives.

The hydrophilic wet-stick adhesive includes a polyacrylate PSA that is the polymerization product of: at least one (meth) acrylate monomer, at least one hydrophilic acidic comonomer, and at least one plasticizing agent. In many embodiments, the polymerizable mixture contains additional additives such as, for example, cross-linking agents, initiators, chain transfer agents, antioxidants, and/or other additives, as desired. In many embodiments, a tackifying agent is compounded with the wet-stick adhesive polymerization product in a useful amount.

The hydrophilic wet-stick adhesive used as a component of the adhesive blends contain at least one monofunctional unsaturated monomer selected from the group consisting of (meth)acrylate esters of non-tertiary alkyl alcohols, the alkyl groups of which can include from 4 to 12 carbon atoms, or 4 to 8 carbon atoms; and mixtures thereof. In many embodiments, the (meth)acrylate monomers have the following general Formula (I):

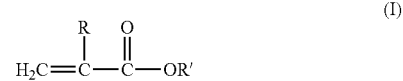

where R is H or $CH_3$ and R' is selected from linear or branched hydrocarbon groups and may contain one or more heteroatoms. In many embodiments, the number of carbon atoms in the hydrocarbon group is 4 to 12, or 4 to 8.

Examples of suitable (meth)acrylate monomers include, but are not limited to, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate and mixtures thereof. In many embodiments, the (meth)acrylate monomers include, n-butyl acrylate, 2-ethylhexyl acrylate, isooctyl acrylate, lauryl acrylate, and mixtures thereof. In one embodiment, the (meth)acrylate monomer includes 2-ethylhexyl acrylate.

Useful hydrophilic acidic comonomers include, but are not limited to, those selected from ethylenically unsaturated carboxylic acids, ethylenically unsaturated sulfonic acids, ethylenically unsaturated phosphonic acids, and mixtures thereof. Examples of such comonomers include those selected from acrylic acid, methacrylic acid, itaconic acid, fumaric acid, crotonic acid, citraconic acid, maleic acid, beta-carboxyethyl acrylate, 2-sulfoethyl methacrylate, styrene sulfonic acid, 2-acrylamido-2-methylpropane sulfonic acid, vinyl phosphonic acid, and the like, and mixtures thereof. In many embodiments, the hydrophilic acidic monomers are ethylenically unsaturated carboxylic acids, or acrylic acid. In one embodiment, the hydrophilic acidic monomers include acrylic acid.

Minor amounts (e.g., not greater than about 10% by weight) of monomers copolymerizable with both the (meth) acrylate monomers and hydrophilic acidic monomers can be used. Examples of such monomers include (meth)acrylamides, vinyl esters and N-vinyl lactams.

The copolymerizable mixture used to make the hydrophilic adhesive includes, based upon 100 parts by weight total, 15 to 85 parts by weight of at least one (meth)acrylate monomer and 85 to 15 parts by weight of a hydrophilic acidic comonomer. In many embodiments, the copolymerizable mixture includes 20 to 80 parts by weight of at least one (meth) acrylate monomer and 80 to 20 parts by weight of a hydrophilic acidic comonomer. In further embodiments, the copolymerizable mixture includes 30 to 70 parts by weight of at least one (meth)acrylate monomer and 30 to 70 parts by weight of a hydrophilic acidic comonomer. The ratio of each comonomer in the hydrophilic adhesive can be chosen to optimize the performance.

Useful plasticizing agents are compatible or miscible with the starting monomers and the resultant polymers of the hydrophilic pressure sensitive adhesive, such that once the plasticizing agent is mixed with the monomers or the resulting polymers, the plasticizing agent does not phase separate. By "phase separation" or "phase separate", it is meant that by differential scanning calorimetry (DSC) no detectable thermal transition, such as a melting or glass transition temperature, can be found for the pure plasticizing agent in the wet stick adhesive composition.

In many embodiments, the plasticizing agent is non-volatile and non-reactive. Particularly useful plasticizing agents include polyalkylene oxides having weight average molecular weights of 150 to 5,000, or 150 to 1,500, such as polyethylene oxides, polypropylene oxides, polyethylene glycols, and copolymers thereof; alkyl or aryl functionalized polyalkylene oxides, such as PYCAL 94 (a phenyl ether of polyethylene oxide, commercially available from ICI Chemicals); benzoyl functionalized polyethers, such as Benzoflex 400 (polypropylene glycol dibenzoate, commercially available from Velsicol Chemicals); monomethyl ethers of polyethylene oxides, UCON 50-HB-400 (polyethylene propylene glycol butyl ethers, commercially available from Dow Chemical) and mixtures thereof. Examples of other useful plasticizing agents include CARBOWAX™ MPEG 550, a methoxypolyethylene glycol plasticizer having a molecular weight of approximately 550 and available from Union Carbide Corp.; Polyol PPG 1025, a polypropylene glycol plasticizer having a molecular weight of approximately 1025 and available from Lyondell Chemical Worldwide, Inc.; Polyol PPG 425, a polypropylene glycol plasticizer having a molecular weight of approximately 425 and available from Lyondell Chemical Worldwide, Inc.; and PLURONIC™ 25R4, an ethylene oxide/propylene oxide block copolymer plasticizer available from BASF Company.

The plasticizing agent can be used in amounts of at least 10 pph (parts by weight per 100 parts of the (meth)acrylate monomers and hydrophilic acidic comonomers). In many embodiments, the plasticizing agent is present in the hydrophilic adhesive in amounts from 15 to 100 pph. In some embodiments, the plasticizing agent is present in amounts from 20 to 80 pph. The amount of plasticizer required depends upon the type and ratios of the (meth)acrylate monomers and hydrophilic acidic comonomers employed in the polymerizable mixture and the chemical class and molecular weight of the plasticizing agent.

In many embodiments, a free radical initiator is added to aid in the copolymerization of the (meth)acrylate comonomers and the acidic comonomers. The type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxypropiophenone, aromatic sulfonyl chlorides such as 2-naphthalenesulfonyl chloride, and photoactive oxides such as 1-phenyl-1,1-propanedione-2-(o-ethoxycarbonyl)oxime. Examples of commercially available photoinitiators are IRGACURE™ 651 (2,2-dimethoxy-1,2-diphenylethane-1-one) and IRGACURE™ 184 (a hydroxy-cyclohexyl phenyl ketone), both commercially available from Ciba Corporation. In many embodiments, the photoinitiator is present in an amount from 0.005 to 1 weight percent based on the weight of the copolymerizable monomers. Examples of suitable thermal initiators include AIBN (2,2'-azobis (isobutyronitrile), hydroperoxides, such as tert-butyl hydroperoxide, and peroxides, such as benzoyl peroxide and cyclohexane peroxide. Depending on the particular initiator used, the product resulting from the copolymerization reaction may further include a residue of the polymerization initiator.

Antioxidants may be used to protect against environmental aging caused by ultraviolet light or heat. Antioxidants include, for example, hindered phenols, amines, and sulfur and phosphorous hydroxide decomposers. In some embodiments, the antioxidant is IRGANOX™ 1010 available from Ciba Corp.

In some embodiments, the polymerizable mixture also includes a chain transfer agent to control the molecular weight of the polymerized compositions. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether and mixtures thereof.

The amount of chain transfer agent that is useful depends upon the desired molecular weight and the type of chain transfer agent. The chain transfer agent can be used in amounts from 0.001 part to 10 parts by weight per 100 parts of total monomer, or from 0.01 part to 0.5 part by weight per 100 parts of total monomer, and or from 0.02 part to 0.20 part by weight per 100 parts of total monomer.

Cross-linking agents could also be added to the polymerizable mixture (dry-stick or wet-stick adhesive), such as, for example, copolymerizable mono-ethylenically unsaturated aromatic ketone comonomers free of ortho-aromatic hydroxyl groups such as those disclosed in U.S. Pat. No. 4,737,559. Specific examples of useful cross-linking agents include para-acryloxybenzophenone, para-acryloxyethoxybenzophenone, para-N-(methylacryloxyethyl)-carbamoylethoxybenzophenone, para-acryloxyacetophenone, ortho-acrylamidoacetophenone, acrylated anthraquinones, and the like. In some embodiments, the cross-linking agent is acryloxy benzophenone. When used, additives are added in amounts sufficient to affect the desired end properties, as known to those skilled in the art.

The dry-stick adhesive includes a polyacrylate PSA that is miscible or compatible with the hydrophilic (wet-stick adhesive) PSA component. In many embodiments, the dry-stick PSA is a non-hydrophobic PSA. The dry-stick adhesive includes a polyacrylate PSA that is the polymerization product of: at least one (meth)acrylate monomer, and at least one hydrophilic acidic comonomer. In some embodiments, the dry-skick polymerizable mixture contains additional additives such as, for example, cross-linking agents, initiators, chain transfer agents, antioxidants, and/or other additives, as described above. In many embodiments, a tackifying agent is compounded with the dry-stick polymerization product in a useful amount.

The dry-stick adhesive of the adhesive blends contains at least one monofunctional unsaturated monomer selected from the group consisting of (meth)acrylate esters of non-tertiary alkyl alcohols, the alkyl groups of which can include from 4 to 12 carbon atoms, or 4 to 8 carbon atoms; and mixtures thereof. In many embodiments, the (meth)acrylate monomers have the general Formula (I) described above. In many embodiments, the (meth)acrylate monomers of the dry-stick adhesive are different than the (meth)acrylate monomers of the wet-stick adhesive.

Examples of suitable (meth)acrylate monomers include, but are not limited to, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate and mixtures thereof. In many embodiments, the (meth)acrylate monomers include, n-butyl acrylate, 2-ethylhexyl acrylate, isooctyl acrylate, lauryl acrylate, and mixtures thereof. In one embodiment, the (meth)acrylate monomer includes isooctyl acrylate.

Useful hydrophilic acidic comonomers include, but are not limited to, those selected from ethylenically unsaturated carboxylic acids, ethylenically unsaturated sulfonic acids, ethylenically unsaturated phosphonic acids, and mixtures thereof. Examples of such comonomers include those selected from acrylic acid, methacrylic acid, itaconic acid, fumaric acid, crotonic acid, citraconic acid, maleic acid, beta-carboxyethyl acrylate, 2-sulfoethyl methacrylate, styrene sulfonic acid, 2-acrylamido-2-methylpropane sulfonic acid, vinyl phosphonic acid, and the like, and mixtures thereof. In many embodiments, the hydrophilic acidic monomers are ethylenically unsaturated carboxylic acids, or acrylic acid. In one embodiment, the hydrophilic acidic monomers include acrylic acid.

Minor amounts (e.g., not greater than 10% by weight) of monomers copolymerizable with both the (meth)acrylate monomers and hydrophilic acidic monomers can be used. Examples of such monomers include (meth)acrylamides, vinyl esters and N-vinyl lactams.

The copolymerizable mixture used to make the hydrophilic adhesive includes, based upon 100 parts by weight total, 75 to 99 parts by weight of at least one (meth)acrylate monomer and 25 to 1 parts by weight of a hydrophilic acidic comonomer. In many embodiments, the copolymerizable mixture includes 85 to 95 parts by weight of at least one (meth) acrylate monomer and 15 to 5 parts by weight of a hydrophilic acidic comonomer. The ratio of each comonomer in the hydrophilic adhesive can be chosen to optimize the performance.

Useful tackifying agents are compatible or miscible with the starting monomers and the resultant polymers of the wet-stick and/or dry-stick pressure sensitive adhesive, such that once the tackifying agent is mixed with the monomers (wet-stick or dry-stick) or the resulting polymers (wet-stick or dry-stick), the tackifying agent does not phase separate. By "phase separation" or "phase separate", it is meant that by differential scanning calorimetry (DSC) no detectable thermal transition, such as a melting or glass transition temperature, can be found for the pure tackifying agent in the dry-stick adhesive composition. In many embodiments, the tackifying agent or resin is miscible or compatible with the both the wet-stick and dry-stick PSA components.

Useful examples of tackifying resins include but are not limited to liquid rubbers, aliphatic and aromatic hydrocarbon resins, rosin, natural resins such as dimerized or hydrogenated balsams and esterified abietic acids, polyterpenes, terpene phenolics, phenol-formaldehyde resins, and rosin esters. In many embodiments, the tackifying resins includes those commercially available from Goodyear under the trade designations ESCOREZ™ and WINGTACK™, rosin esters, such as those commercially available from Hercules, Inc. under the trade designations FORAL™ and STAYBELITE™ Ester 10; hydrogenated hydrocarbons, such as that commercially available from Exxon under the trade designation ESCOREZ™ 5000; polyterpenes, such as that commercially available from Hercules, Inc. under the trade designation PICCOLYTE™ A; and terpene phenolic resins derived from petroleum or terpentine sources, such as that commercially available under the trade designation PICCOFYN™ A100.

The tackifying agent can be used in amounts of at least 1 part by weight (part by weight of adhesive blend total weight). In many embodiments, the tackifying agent is present in the in amounts from about 1 to 15 parts by weight. In some embodiments, the tackifying agent is present in amounts from about 5 to 10 parts by weight. In other embodiments, the tackifying agent is present in amounts from about 6 to 9 parts by weight. The amount of plasticizer required depends upon the type and ratios of the (meth)acrylate monomers and acidic comonomers employed in the polymerizable mixture and the chemical class and molecular weight of the tackifying agent.

Polymerization methods, such as the continuous free radical polymerization method described in U.S. Pat. Nos. 4,619,979 and 4,843,134; the essentially adiabatic polymerization methods using a batch reactor described in U.S. Pat. No. 5,637,646; and, the methods described for polymerizing packaged polymerizable mixtures described in U.S. Pat. No. 5,804,610 may be utilized to prepare the PSA polymers of Component I and Component II. Polymerization can also be effected by exposure to ultraviolet (UV) radiation as described in U.S. Pat. No. 4,181,752.

In many embodiments, wet-stick adhesive, dry-stick adhesive, and tackifying agent can be blended and coated using melt extrusion techniques or by solvent coating. However, blending can be done by any method that results in a substantially homogeneous distribution of wet-stick adhesive, dry-stick adhesive, and tackifying agent in the PSA blend.

Wet-stick adhesive, dry-stick adhesive, and tackifying agent can be blended together in any useful ratio or amount. In many cases, the PSA blend possesses 180 degree peel adhesions that are greater than 180 degree peel adhesions of the individual wet-stick adhesive or dry-stick adhesive (with tackifying agent) on wet and/or dry substrates. In some embodiments, the blend includes 25 to 75 parts by weight of the wet-stick adhesive, 60 to 21 parts by weight of the dry-stick adhesive, and 15 to 1 parts by weight of tackifying agent. In other embodiments, the blend includes 40 to 60 parts by weight of wet-stick adhesive, 51 to 34 parts by weight of the dry-stick adhesive, and 9 to 6 parts by weight of tackifying agent. In other embodiments, the blend includes 45 to 55 parts by weight of wet-stick adhesive, 47 to 39 parts by weight of the dry-stick adhesive, and 8 to 6 parts by weight of tackifying agent.

If a hot melt coating is desired, a blend is prepared by melt mixing the wet-stick adhesive, dry-stick adhesive, and tackifying agent in the molten or softened state using devices that provide dispersive mixing, distributive mixing, or a combination of dispersive and distributive mixing. Both batch and continuous methods of blending may be used. Examples of batch methods include Brabender™ or Banbury™ internal mixing, and roll milling. Examples of continuous methods include single screw extruding, twin screw extruding, disk extruding, reciprocating single screw extruding, and pin barrel single screw extruding. The continuous methods can include both distributive elements such as cavity transfer elements such as CTM™, available from RAPRA Technology, Ltd., Shrewsbury, England, pin mixing elements, and static mixing elements and dispersive elements such as Maddock mixing elements or Saxton mixing elements.

An example of a batch process is the placement of a portion of the blend between the desired substrate to be coated and a release liner, pressing this composite structure in a heated platen press with sufficient temperature and pressure to form a pressure-sensitive coating of the desired thickness and cooling the resulting coating.

Continuous forming methods include drawing the pressure-sensitive adhesive blend out of a film die and subsequently contacting a moving plastic web or other suitable substrate. A related continuous method involves extruding the pressure-sensitive adhesive blend and a coextruded backing material from a film die and subsequently cooling to form a pressure-sensitive adhesive blend tape.

Other continuous forming methods involve directly contacting the pressure-sensitive adhesive blend to a rapidly moving plastic web or other suitable substrate. In this method, the pressure-sensitive adhesive blend can be applied to the moving web using a die having flexible die lips such as a reverse orifice-coating die. After forming, the pressure-sensitive adhesive coatings are solidified by quenching using both direct methods, such as chill rolls or water baths, and indirect methods, such as air or gas impingement.

Mixing or compounding can be done by any method that results in a substantially homogeneous distribution of wet-stick adhesive, dry-stick adhesive, and tackifying agent. In some embodiments, wet-stick adhesive, dry-stick adhesive, and tackifying agent are blended and coated using solvent blending and solvent coating techniques. In many embodiments, wet-stick adhesive, dry-stick adhesive, and tackifying agent are substantially soluble in the solvents used.

The adhesive blends described herein are useful to prepare adhesive coated articles. The described adhesive blends are particularly suitable for applications that may have both wet and dry surfaces such as, for example, repair applications. The adhesive blends may be coated onto any suitable backing such as, for example a reinforced backing or substrate. In one embodiment the backing includes a polyester fiber scrim and a polymeric film, such as a duct tape substrate. In many embodiments, the adhesive blend can sufficiently adhere to a variety of wet and dry surfaces including, glass, stainless steel, and polymeric surfaces.

The coated adhesive blends described herein can be crosslinked by exposure to ultraviolet radiation from, for example, medium pressure mercury arc lamps, or by exposure to an electron beam (e-beam). For example, coated adhesive blends can be irradiated with E-beam radiation at a level of 2 Mrad dosage at 175 kV directly after and in-line with the coating process using an ELECTOCURTAIN™ CB-175 electron beam system available from Energy Sciences, Inc., Wilmington, Mass.

This disclosure is further illustrated by the following examples that are not intended to limit the scope of the invention. In the examples, all parts, ratios and percentages are by weight unless otherwise indicated. The following test methods were used to evaluate and characterize the adhesive compositions and blends produced in the examples. All materials are commercially available, for example from Aldrich Chemicals, unless otherwise indicated or described.

EXAMPLES

Methods

Dry Adhesion

The dry peel adhesion method was used to measure the force required to remove an adhesive-coated sample from a test substrate surface at a specific angle and rate of removal. The room temperature peel adhesion was measured at 21 degrees Celsius and 50% relative humidity against either, a clean glass, stainless steel plate, or low density polyethylene (LDPE) plate. A tape sample (2.5-cm wide×15 cm long) was adhered to the test substrate using four passes of 2 kg rubber-faced roller and tested after 10 seconds using a Model 3MI90 Slip/Peel tester (IMASS, Inc., Accord, Mass.) at an angle of 180 degrees and a rate of 229 cm/min for glass, and 30 cm/min for both stainless steel and LDPE. An average result was recorded in N/dm.

Wet Adhesion

The wet peel adhesion method was used to measure the force required to remove an adhesive-coated sample from an under water test substrate surface at a specific angle and rate of removal. The room temperature peel adhesion was measured at 21 degrees Celsius and 50% relative humidity against either, a clean glass, stainless steel plate, or low density polyethylene (LDPE) plate. The adhesive side of the tape sample (2.5-cm wide×15 cm long) was immersed in water for 1 minute and then adhered to the under water test substrate using four passes of 2 kg rubber-faced roller and tested after one minute using a Model 3MI90 Slip/Peel tester (IMASS, Inc., Accord, Mass.) at an angle of 180 degrees and a rate of 229 cm/min for glass, and 30 cm/min for both stainless steel and LDPE. An average result was recorded in N/dm.

Glossary
2EHA refers to 2-ethylhexyl acrylate.
AA refers to acrylic acid.
IOA refers to isooctyl acrylate.
IRG1010 refer to IRGANOX™ 1010 antioxidant, tetrakis [methylene-3-(3',5'-di-tert-butyl-4'-hydroxyphenyl)propionate]methane (commercially available from Ciba-Geigy Corp., Switzerland).
IRG651 refers to IRGACURE™ 651 (2,2-dimethoxy-1,2-diphenylethane-1-one) photoinitiator (commercially available from Ciba Corp., Switzerland).
IOTG refers to a chain transfer agent, isooctyl thioglycolate (commercially available from Hampshire Chemical, a subsidiary of the Dow Chemical Company, Lexington, Mass.).
ABP refers to para-acryloxybenzophenone, a U.V. crosslinker, prepared according to U.S. Pat. No. 4,737,559, Example A.
UCON refers to UCON™ 50-HB-400, a polyethylene polypropylene glycol butyl ether, (commercially available plasticizer from Dow Chemical).
CV-60 natural rubber is commercially available from RCMA Americas Inc., Norfolk Va.
PICOTAC™ B is a hydrocarbon resin commercially available from Eastman Chemical Resins, West Elizabeth, Pa.
FORAL 3085 is a hydrogenated rosin glycerol ester commercially available from Hercules Inc., Resins Division, Wilmington, Del.
$CaCO_3$ is calcium carbonate.

Adhesive Sample Preparation

The adhesive samples were prepared by forming Component I and Component II and compounding Component I and Component II using a 30 mm twin-screw extruder and hot-melt coating the adhesive blend with a 14 cm wide rotary rod die onto a polyester multifilament fiber scrim with a 65 micrometer thick grey LDPE backing with a standard low adhesion backside (standard duct tape substrate). The feed rate was about 5.45 kg/hour and the line speed was about 4.9 m/min. The coat weight was about 30 grains/4"×6" for each tape sample. The sample was then U.V. cured in line at 800 mJ UVA.

The 3M Home and Shop Duct Tape was provided as is commercially available. The coat weight on the 3M Home and Shop Duct Tape manufactured at 3M London was about 35 grains/4"×6".

Example 1

A hydrophilic pressure sensitive adhesive (Component I) was prepared according to the disclosure of U.S. Pat. No. 6,855,386. The hydrophilic pressure sensitive adhesive was the following formulation: 2-EHA/AA/UCON/IOTG/IRG51/IRG010 (46.4/25/28.6/0.03/0.15/0.4).

Example 2

This sample was the commercially available 3M Home and Shop Duct Tape.

Example 3

A hydrophilic pressure sensitive adhesive (Component I) was prepared according to Example 1 and was compounded with a natural rubber (hydrophobic) composition that was the following formulation: CV-60/PICOTAC/$CaCO_3$ (100/110/127). The adhesive blend was 60 parts Component I and 40 parts natural rubber composition.

Example 4

A pressure sensitive adhesive (Component II) was prepared according to the disclosure of U.S. Pat. No. 5,753,768. The pressure sensitive adhesive (Component II) was the following formulation: IOA/AA/ABP (90/10/0.23) blended with 15 parts of FORAL 3085.

Example 5

A hydrophilic pressure sensitive adhesive (Component I) was prepared according to Example 1 and was compounded with the pressure sensitive adhesive (Component II) of Example 4. The adhesive blend was 50 parts Component I and 50 parts Component II.

Example 6

This sample was a repeat sample of Example 5.

Example 7

A hydrophilic pressure sensitive adhesive (Component I) was prepared according to Example 1 and was compounded with the pressure sensitive adhesive (Component II) of Example 4. The adhesive blend was 50 parts Component I and 50 parts Component II. This sample was compounded in a reverse order to Examples 5 and 6.

Examples 1 to 7 were tested for wet and dry adhesion to a variety of substrates according to the methods described above. The results are illustrated in Table 1 below.

TABLE 1

| Example | Substrate | Dry Adhesion N/dm | Wet Adhesion N/dm |
|---|---|---|---|
| 1 | Glass | 125 | 12 |
|   | Stainless Steel | 56 | 86 |
|   | LDPE | 9 | 25 |
| 2 | Glass | 50 | 2 |
|   | Stainless Steel | 47 | 32 |
|   | LDPE | 47 | 40 |
| 3 | Glass | 68 | 9 |
|   | Stainless Steel | 44 | 36 |
|   | LDPE | 32 | 28 |
| 4 | Glass | 65 | 30 |
|   | Stainless Steel | 41 | 37 |
|   | LDPE | 22 | 23 |
| 5 | Glass | 86 | 33 |
|   | Stainless Steel | 67 | 57 |
|   | LDPE | 30 | 26 |
| 6 | Glass | 85 | 39 |
|   | Stainless Steel | 50 | 53 |
|   | LDPE | 34 | 40 |
| 7 | Glass | 71 | 45 |
|   | Stainless Steel | 52 | 48 |
|   | LDPE | 32 | 39 |

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein. Accordingly, the disclosure is to be limited only by the claims provided below.

The invention claimed is:

1. An adhesive composition comprising an adhesive blend of:
   a first hydrophilic pressure sensitive adhesive comprising a polymerization product of:
      (a) 15 to 85 parts by weight of a first (meth)acrylate ester monomer wherein the (meth)acrylate ester monomer, when polymerized, has a glass transition temperature ($T_g$) of less than about 10 degrees Celsius;
      (b) 85 to 15 parts by weight of a first hydrophilic acidic comonomer; and
      (c) at least 10 parts based on 100 parts of the sum of components (a)+(b) of a plasticizing agent comprising polyethylene propylene glycol butyl ether;
   a second pressure sensitive adhesive comprising a polymerization product of:
      (a) 75 to 99 parts by weight of a second (meth)acrylate ester monomer; and
      (b) 25 to 1 parts by weight of a second hydrophilic acidic comonomer; wherein, the second pressure sensitive adhesive is miscible in the first hydrophilic pressure sensitive adhesive; and
   a tackifying agent.

2. An adhesive composition according to claim 1, wherein the adhesive blend comprises:
   a first hydrophilic pressure sensitive adhesive comprising a polymerization product of:
      (a) 30 to 70 parts by weight of the first (meth)acrylate ester monomer wherein the (meth)acrylate ester monomer, when polymerized, has a glass transition temperature ($T_g$) of less than about 10 degrees Celsius;

(b) 70 to 30 parts by weight of the first hydrophilic acidic comonomer; and
(c) at least 20 parts based on 100 parts of the sum of components (a)+(b) of the plasticizing agent; and
a second pressure sensitive adhesive comprising a polymerization product of:
(a) 85 to 95 parts by weight of the second (meth)acrylate ester monomer; and
(b) 15 to 5 parts by weight of the second hydrophilic acidic comonomer; and the tackifying agent.

3. An adhesive composition according to claim 1, wherein the adhesive blend comprises 25 to 75 parts by weight of the first hydrophilic pressure sensitive adhesive, 60 to 24 parts by weight of the second pressure sensitive adhesive, and 15 to 1 part by weight of the tackifying agent.

4. An adhesive composition according to claim 1, wherein the adhesive blend comprises 40 to 60 parts by weight of the first hydrophilic pressure sensitive adhesive, 51 to 34 parts by weight of the second pressure sensitive adhesive, and 9 to 6 parts by weight of the tackifying agent.

5. An adhesive composition according to claim 1, wherein the first (meth)acrylate ester monomer comprises ethyihexyl acrylate, the first hydrophilic acidic-comonomer comprises acrylic acid, the second (meth)acrylate ester monomer comprises isooctyl acrylate and the second hydrophilic acidic comonomer comprises acrylic acid.

6. An adhesive composition according to claim 1, wherein the adhesive blend further comprises a cross-linking agent.

7. An adhesive article comprising:
a reinforced tape; and
a pressure sensitive layer according to claim 1 disposed on the reinforced taped.

8. An adhesive article according to claim 7 wherein the adhesive blend has an initial peel adhesion to glass underwater that is greater than a first hydrophilic pressure sensitive adhesive initial peel adhesion to glass underwater.

9. An adhesive article according to claim 7 wherein the adhesive blend has an initial peel adhesion to dry glass that is greater than a non-hydrophobic pressure sensitive adhesive initial peel adhesion to dry glass.

10. An adhesive article according to claim 7 wherein the reinforced tape comprises a polyester fiber scrim.

\* \* \* \* \*